US010855868B1

(12) United States Patent
Wushour

(10) Patent No.: US 10,855,868 B1
(45) Date of Patent: Dec. 1, 2020

(54) SYSTEMS, PROCESSES, AND COMPUTER PROGRAM PRODUCTS FOR DETECTING AND VERIFYING INVISIBLE INFORMATION IN DOCUMENTS

(71) Applicant: KYOCERA Document Solutions Inc., Osaka (JP)

(72) Inventor: Dilinur Wushour, Clayton, CA (US)

(73) Assignee: KYOCERA Document Solutions Inc.

( * ) Notice: Subject to any disclaimer, the term of this patent is extended or adjusted under 35 U.S.C. 154(b) by 0 days.

(21) Appl. No.: 16/566,204

(22) Filed: Sep. 10, 2019

(51) Int. Cl.
| H04N 1/40 | (2006.01) |
| H04N 1/00 | (2006.01) |
| G06F 16/16 | (2019.01) |
| H04N 1/32 | (2006.01) |
| G06K 9/00 | (2006.01) |

(52) U.S. Cl.
CPC ....... *H04N 1/00867* (2013.01); *G06F 16/164* (2019.01); *G06K 9/00442* (2013.01); *H04N 1/32149* (2013.01); *G06K 2209/01* (2013.01); *G06K 2209/27* (2013.01)

(58) Field of Classification Search
None
See application file for complete search history.

(56) References Cited

U.S. PATENT DOCUMENTS

| 6,421,145 B1 | 7/2002 | Kurita et al. |
| 6,542,629 B1 | 4/2003 | Wu et al. |
| 6,556,688 B1 | 4/2003 | Ratnakar |
| 7,397,584 B2 * | 7/2008 | Harrington ........... G06T 1/0028 358/1.18 |
| 7,821,674 B2 | 10/2010 | Naito et al. |
| 7,894,102 B2 | 2/2011 | Noguchi |
| 8,189,213 B2 | 5/2012 | Tsutsumi |
| 9,836,634 B2 * | 12/2017 | Xu ........................ G06K 9/2063 |
| 10,455,113 B1 * | 10/2019 | Fielding ............. H04N 1/00347 |
| 2005/0006480 A1 * | 1/2005 | Talluri ............... G06K 17/0016 235/468 |
| 2007/0188817 A1 * | 8/2007 | Noguchi ............ H04N 1/32144 358/3.28 |
| 2009/0050700 A1 * | 2/2009 | Kamijoh .......... G06K 19/06028 235/440 |
| 2011/0317186 A1 * | 12/2011 | Tanaka ..................... H04N 1/46 358/1.9 |
| 2019/0065798 A1 * | 2/2019 | Garey .................. G06K 7/1413 |

* cited by examiner

*Primary Examiner* — Dung D Tran
(74) *Attorney, Agent, or Firm* — Law Office of Alexis J. Saenz

(57) ABSTRACT

Embodiments identify documents with invisible or hidden information such as tracking codes and extract the tracking codes, which may be leveraged for different applications. Aspects may protect an individual's right to privacy by extracting "invisible" codes from a document. Other aspects preserve the authenticity of documents by converting the information of an extracted tracking code into other metadata which may accompany the document and copies of the document. In an embodiment, a blockchain ledger may be used to verify the authenticity of a document using information from the original tracking code.

20 Claims, 6 Drawing Sheets

Distributed Blockchain

US 10,855,868 B1

SYSTEMS, PROCESSES, AND COMPUTER PROGRAM PRODUCTS FOR DETECTING AND VERIFYING INVISIBLE INFORMATION IN DOCUMENTS

CROSS-REFERENCE TO RELATED APPLICATION

None.

FIELD

The subject disclosure relates to networks and more particularly to systems, processes, and computer program products for detecting and verifying invisible information in documents and for authentication of documents.

BACKGROUND

Different brands of color laser printers add invisible or hidden information to documents. In one form, the information is printed as visually imperceptible yellow dots. The barely perceptible yellow dots can be used to trace a printed document to its source: the date and time it was printed, and the serial number of the exact printer on which it was printed. The feature was originally intended as a deterrent to counterfeiting currency with laser printers.

The millimeter-sized dots appear about every inch on a page, nestled within the printed words and margins. The dots' minuscule size, covering less than one-thousandth of the page, along with their color combination of yellow on white, makes them invisible to the naked eye.

SUMMARY

In one aspect of the disclosure, a method of protecting the authenticity of documents is disclosed. The method comprises: receiving a document, including invisible printed information, by an optical scanning device; scanning the document; capturing an image of content in the scanned document; identifying the invisible printed information in the captured image of the scanned document; generating metadata representing the identified invisible printed information; extracting the invisible printed information from the captured image of the scanned document; converting the captured image of the scanned document into an electronic copy of the received document, without the invisible printed information being present in the electronic copy; and attaching the generated metadata to the converted electronic copy of the received document.

In another aspect of the disclosure, a computer program product to protect the authenticity of documents is disclosed. The computer program product comprises a non-transitory computer readable storage medium having computer readable program code embodied therewith. The computer readable program code is configured, when executed by a processor, to: receive a document, including invisible printed information, by an optical scanning device; scan the document; capture an image of content in the scanned document; identify the invisible printed information in the captured image of the scanned document; generate metadata representing the identified invisible printed information; extract the invisible printed information from the captured image of the scanned document; convert the captured image of the scanned document into an electronic copy of the received document, without the invisible printed information being present in the electronic copy; and attach the generated metadata to the converted electronic copy of the received document.

In yet another aspect, a computing apparatus is disclosed. The computing apparatus, comprises an optical scanner module; a memory storage unit; and a processing unit coupled to the optical scanner module and to the memory storage unit, wherein computer readable program code in the memory storage unit is configured to protect the authenticity of documents, by controlling the processing unit to: receive a document, including invisible printed information, by the optical scanner module; scan the document; capture an image of content in the scanned document; identify the invisible printed information in the captured image of the scanned document; generate metadata representing the identified invisible printed information; extract the invisible printed information from the captured image of the scanned document; convert the captured image of the scanned document into an electronic copy of the received document, without the invisible printed information being present in the electronic copy; and attach the generated metadata to the converted electronic copy of the received document.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
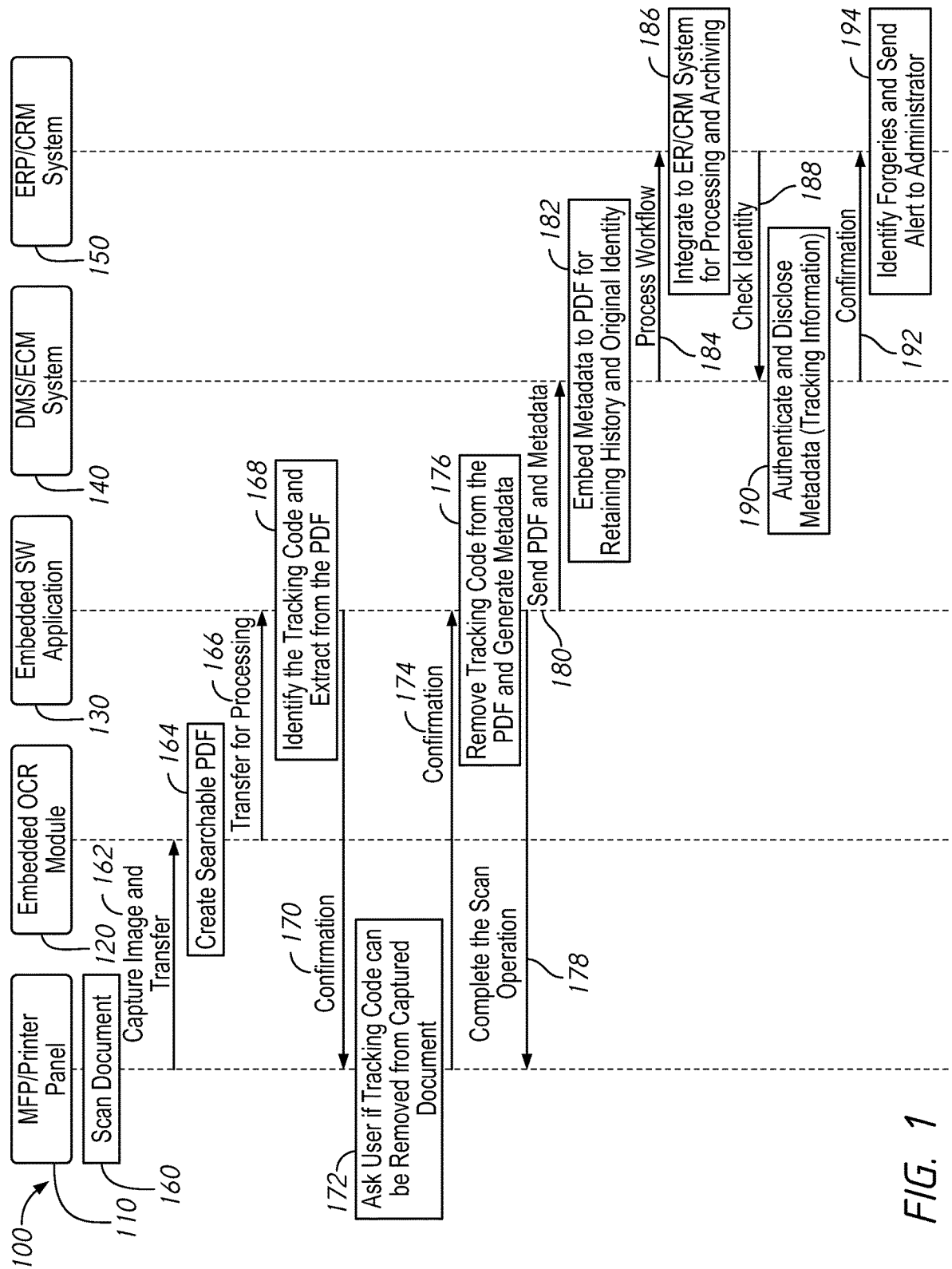
FIG. 1 is a system flow diagram of a method for determining the authenticity of documents through extracted information in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of document scanning and document authentication.

In general, as used below, a "document" may refer to a sheet of paper or multiple sheets that will be assembled into an overall publication. A "document" may also refer to an electronic copy of a paper where an electronic copy is not specifically referenced.

Generally, embodiments of the subject technology provide identification of documents with information embedded in the document that may be invisible to the naked eye. Invisible information may include for example, microdots, barcodes, text/graphics printed in grayscale or color imperceptible to the human eye, or text/graphics in font imperceptible to the human eye.

The embodiments disclosed identify the presence of invisible or hidden information printed onto the document and extract the invisible information from an electronic copy of the document. Information from extracted tracking codes, for example, may be leveraged for different applications.

As will be appreciated, aspects of the disclosed embodiments provide several benefits. Aspects may protect an individual's rights by extracting these "invisible" codes from a document. For example, while microdots printed onto a document were useful to identify a suspect who leaked a top-secret classified document, the tracking information associated with the dots may violate an individual's right to privacy.

From a business perspective, numerous previously printed documents need to be scanned/captured and integrated into DMS/ECM systems. Preserving the fidelity of the original document is a challenge due to limited scan quality. In this case, those microdots may not be captured properly, and the document may lose its tracking identity. Aspects may preserve the content of the hidden information by converting the document into a mode for better accuracy of optical recognition. In addition, some embodiments convert the hidden information into another form of information that can be more easily read.

Other aspects preserve the authenticity of documents by converting the information of an extracted tracking code into other metadata which may accompany the document and copies of the document. In an embodiment, a blockchain ledger may be used to verify the authenticity of a document using information from the original tracking code. Embedded software may generate metadata with tracking information and may integrate metadata into the scanned document. Later the metadata can be used by a DMS/ECM system for its classification, workflow, archiving process. The goal is to retain document history and original identity. This may be very useful for the administration of or access to copies of legal/sensitive documents including for example, social security numbers, birth certificates, contracts, legal agreements, etc.

Some embodiments may capture documents, preserve the information as part of a document's history and authenticate/validate the user information via blockchain for security and privacy. As may be appreciated, some aspects enhance ECM with blockchain concepts that can serve both user and governance needs. The blockchain-enhanced enterprise content platform may provide a secure and compliant system that protects data, respects individual privacy and empowers companies by creating anonymized, verified and self-managed 'profiles' for employees, customers and suppliers.

In addition, some aspects are useful for identifying forgeries. The tracking code can be integrated into a blockchain (distributed ledger) as unique identity, especially for confidential documents (legal agreements that signed by different parties). Forgeries may be identified when the stored metadata of a tracking code does not match information in a presented document.

Definitions

MFP—Multi Function Printer

A multifunction printer (MFP) is a device that consolidates the functionality of a printer, copier, scanner and/or fax into one machine.

Embedded software—A software running in a device (Printer/MFP)

Embedded software is computer software, written to control machines or devices that are not typically thought of as computers, commonly known as embedded systems. It is typically specialized for the particular hardware that it runs on and has time and memory constraints.

Capture—the process of scanning paper documents

Document capture is any one of several processes used to convert a physical document to another format, typically a digital representation. At its simplest, document capture involves scanning a physical document and saving it as a digital image. However, in the context of enterprise information management, creating a digital image file is often not adequate for business purposes. For text documents, capture usually includes processes like optical character recognition (OCR), so that the information contained in the document can be accessed and integrated with an organization's information systems.

OCR—Optical Character Recognition

OCR is the recognition of printed or written text characters by a software. This involves photoscanning of the text character-by-character, analysis of the scanned-in image, and then translation of the character image into character codes, such as ASCII, commonly used in data processing. In OCR processing, the scanned-in image or bitmap is analyzed for light and dark areas in order to identify each alphabetic letter or numeric digit. When a character is recognized, it is converted into an ASCII code. Special circuit boards and computer chips designed expressly for OCR are used to speed up the recognition process.

Metadata

Metadata is structured information that describes, explains, locates, or otherwise makes it easier to retrieve, use, or manage an information resource. Metadata is often called data about data or information about information.

There are three main types of metadata:

Descriptive metadata describes a resource for purposes such as discovery and identification. It can include elements such as title, abstract, author, and keywords.

Structural metadata indicates how compound objects are put together, for example, how pages are ordered to form chapters.

Administrative metadata provides information to help manage a resource, such as when and how it was created, file type and other technical information, and who can access it. There are several subsets of administrative data:

Rights management metadata, which deals with intellectual property rights

Preservation metadata, which contains information needed to archive and preserve a resource.

In this disclosure, administrative metadata can be used to track or identify forgery.

DMS—Document Management System

A document management system is a system used to track, manage and store documents and reduce paper. Most are capable of keeping a record of the various versions created and modified by different users. Document management systems commonly provide storage, versioning, metadata, security, as well as indexing and retrieval capabilities. The DMS may also extract metadata from the document automatically or prompt the user to add metadata in some of the steps described below.

ECM—Enterprise Content Management

Enterprise content management extends the concept of content management by adding a timeline for each content item and possibly enforcing processes for the creation, approval and distribution of them.

Enterprise content management, as a form of content management, combines the capture, search and networking of documents with digital archiving, document management and workflow. It specifically includes the special challenges involved in using and preserving a company's internal, often unstructured information, in all of its forms.

Distributed Ledger

A distributed ledger may be a database that is consensually shared and synchronized across network spread across multiple sites, institutions or geographies. The distributed ledger database may be spread across several nodes (devices) on a peer-to-peer network, where each replicates and saves an identical copy of the ledger and updates itself independently. In some embodiments, there is an advantage to a lack of central authority. When a ledger update happens, each node may construct the new transaction, and then the nodes vote by consensus algorithm on which copy is correct. Once a consensus has been determined, all the other nodes update themselves with the new, correct copy of the ledger. Security may be accomplished through cryptographic keys and signatures.

Blockchain

A blockchain may be a ledger that records a history of transactions between all the users since its creation. It permits the storage and transmission of information. The database is distributed, which means the transactions are validated by a consensus process and shared to all the participants (Peer-to-peer). It allows counterparties to make secured direct transactions without a central intermediary. Trust is ensured through a mutual consensus verification protocol. The set of rules and procedures for authenticating and validating the information are added to the distributed ledger by the members of the network (all the members or a majority) and not by a central authority.

Embodiments of the Subject Technology

For the following flowcharts, steps of the processes may be referred to as blocks. As will be described further below, steps may be performed by a machine, for example, a computing device, an image forming apparatus, and/or a processing unit. In general, the steps may be coordinated through a server(s) connected to the blockchain. While the steps may be described in one order, it will be understood that variations to the order may be practiced or the order in which claims below are written may vary from the following without departing from the scope of the invention.

Referring now to FIG. 1, a method 100 of protecting the authenticity of documents is shown according to an exemplary embodiment. FIG. 1 shows a sequence diagram of steps that may occur between elements in a system embodiment. The system elements may include a multi-function printer (MFP) 110 with a printer panel, an embedded optical character recognition (OCR) module 120, an embedded software application 130, a document management system (DMS) or enterprise content management system (ECM) 140, and an enterprise resource planning (ERP) or customer-relationship management (CRM) system 150.

In block 160, a document may be received by the MFP 110. The MFP 110 may include a scanner unit as will be described in further detail below in FIG. 3 and FIG. 4. The scanner unit may start a scan process of the document for text and graphics forming one or more images. The document (or its image) may be captured and transferred 162 to the OCR module 120. The OCR module 120 may create 164 a searchable version of the scanned document (for example, as a PDF document of the transferred image(s)). The scanned document may be forwarded 166 to the software application 130. The software application 130 may identify 168 any invisible or hidden information (for example, a tracking code) printed into the originally received document from the image of the scanned document. In an exemplary embodiment, identified invisible printed information may be extracted from the scanned document. In some embodiments, confirmation of the information being extracted may be sent 170 to the MFP 110. Some embodiments may include a query sent 172 to the user asking if the invisible information may be extracted from the scanned document. The query may be displayed on the printer panel and input from the user may be received through the printer panel. A confirmation message from the user may be sent 174 back to the software application. The invisible information may be removed (extracted) 176 from the scanned document. In an exemplary embodiment, metadata representing the content of invisible information that was removed may be generated and saved as a separate file. The scanned document with the captured image may be converted into an electronic copy of the received document, without the invisible printed information being present in the electronic copy. The MFP 110 may complete 178 the scan operation.

In some embodiments, the method 100 may further include an authentication process which may authenticate documents or access to documents. The electronic copy and the generated metadata of the invisible information may be sent 180 to the DMS/ECM system 140. The generated metadata representing the invisible information may be embedded 182 by the DMS/ECM system 140 into the converted electronic copy to retain history of the document and the original identity of the document. For example, the information may indicate the original creation of the document, its source, and a hash of its original state before any modifications. A copy of the electronic copy with the metadata may be sent 184 for archival to a database. The database may be for example, a distributed ledger. In some embodiments, the ERP/CRM system 150 may comprise a distributed ledger for administering transactions involving authentication of documents or access to documents. The copy of the electronic copy with the metadata may be stored 186 in the ERP/CRM system 150 for authentication processing and archiving.

For example, in the context of checking 188 the authenticity of a document (which may include checking the document for modifications since its creation), the process may include extracting invisible information and generating metadata from the extracted information of a document being authenticated per the steps described above. The metadata of the document being authenticated may be compared 190 to the stored metadata of the original document. The comparison may be performed for example, by the DMS/ECM system 140. Confirmation that the metadata of the two documents match may be sent 192 to the ERP/CRM system 150. In the alternative, if the metadata being compared do not match, forgeries of the document may be identified, and an alert may be sent 194 to an administrator indicating a document being used in a transaction is not authentic.

In another embodiment, access to an authentic document may use the extracted information to authenticate authorization to the document. For example, the metadata may also be used for authenticating an access to sensitive documents. In an exemplary application, school administration would receive an authentication code to access an authenticated copy of a student's birth certificate stored in the DMS/ECM system 140 instead of requiring the student to provide an original copy. The authentication code (password) may be generated via SHA256 hash of metadata (tracking code information—time&serial #) which was attached to the authenticated copy of the certificate. The school administration may receive through an encrypted transaction a copy of the access code provided by the DMS/ECM system 140. Upon input of the access code, the DMS/ECM system 140 may compare the metadata from the input code to a copy of the metadata stored in the ERP/CRM system 150 to authenticate access.

Figure 2:
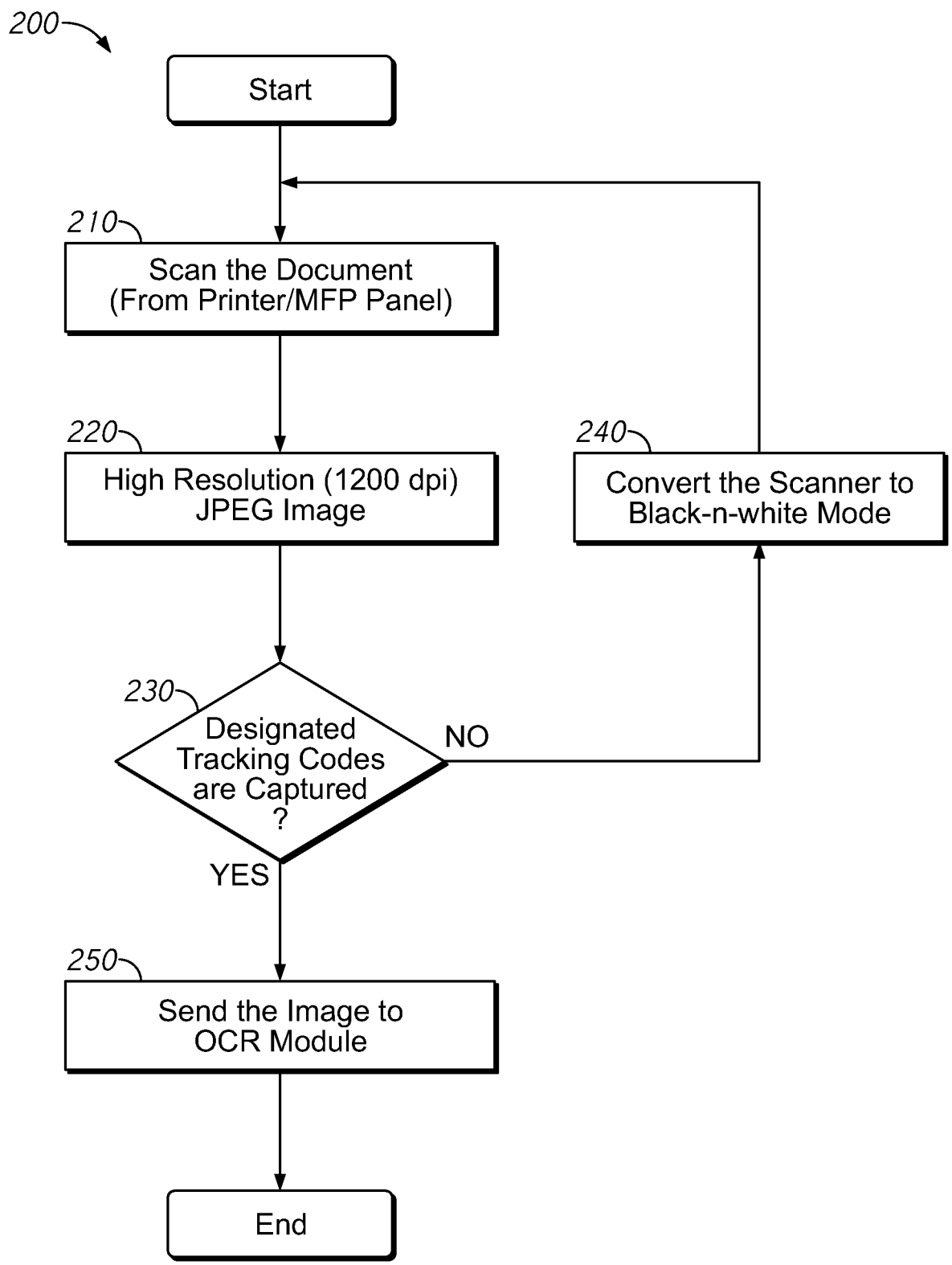
FIG. 2 is a flowchart for a method of capturing tracking codes in a printed document in accordance with embodiments of the subject technology.

Referring now to FIG. 2, a method 200 of capturing tracking codes in a printed document is shown according to an exemplary embodiment. The method 200 may expand on the details of blocks 160-166 performed at the scanner module level. In block 210, the received document may be scanned. A command to scan may be performed in response to input received at the Printer/MFP panel. A high resolution (for example, 1200 dpi) JPEG image may be generated 220. A determination 230 of whether invisible information (for example, tracking codes) was present in the JPEG image and captured may be performed. If invisible information was not captured, the system may convert 240 the scanner module to black and white mode. As will be appreciated, some invisible information such as tracking codes is in yellow and may be difficult to capture using a regular scanner due to light color texture. The document may be scanned in black-n-white (monochrome) mode, which will enhance the scanning/capturing quality of content present in the image that may not be capturable in high resolution color mode. That way the tracking code can be detected easily as light gray color instead of yellow, which also improves the OCR accuracy. However, if invisible information was detected present in the high resolution image, then the generated image may be sent 250 to the OCR module for processing the content of the image including the invisible information.

Figure 3:
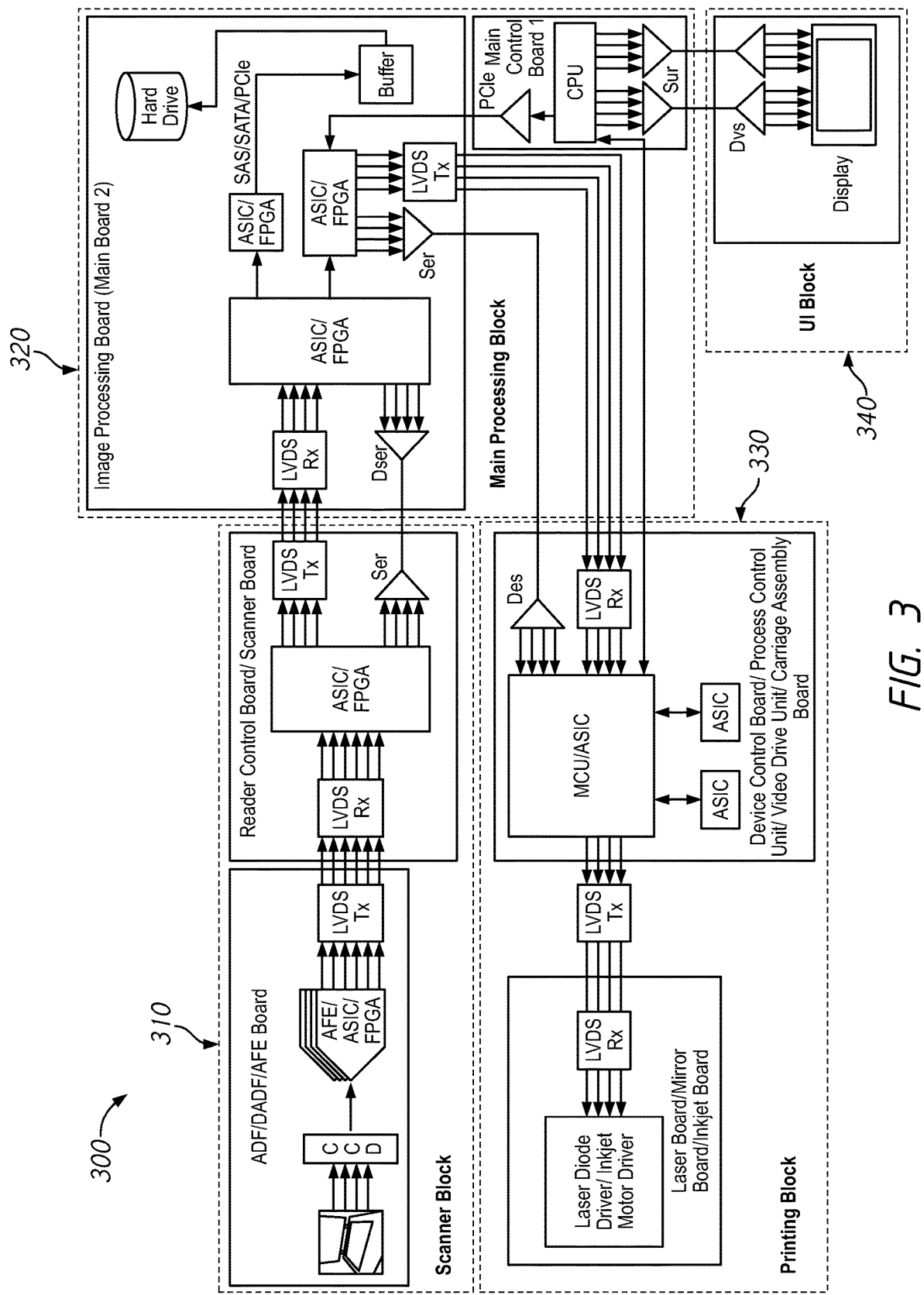
FIG. 3 is a block diagram of a multifunction printer system in accordance with embodiments of the subject technology in accordance with embodiments of the subject technology.

Referring now to FIG. 3, a multifunction printer system 300 is shown according to an exemplary embodiment. The multifunction printer (MFP) system 300 is a device that consolidates the functionality of a printer, copier, scanner and/or fax into one machine. In general, the MFP system 300 includes a scanner block 310, a main processing block 320, a printing block 330, and a user interface (UI) block 340. The scanner block 310 may perform the steps related to FIG. 2 above. In FIG. 1, the scanner block 310 may be responsible for blocks 160, 162, 172, 174, and 178 in FIG. 1. The main processing block 320 may perform many of the decision and software based operations described above. A processing unit (labeled as "CPU") may perform many of the action based steps disclosed throughout the specification as executable program steps in software or firmware resident in the system. Details of the processing unit may seen further below with respect to a general computing device. The printing block 330 may generate hard copies of electronic files into paper documents. For example, an original document with invisible information, a scanned document with the invisible information extracted from the page, or a scanned document with metadata inserted onto the page, representing extracted information, may be printed out onto a sheet of paper. The UI block 340 may include a user interface panel from which a user may press hardware or digitally displayed buttons which trigger one or more commands. An exemplary command may include confirming the extraction of invisible information from a document (see block 172) which triggers the removal of the information before converting the document into a PDF document without the invisible information present.

Figure 4:
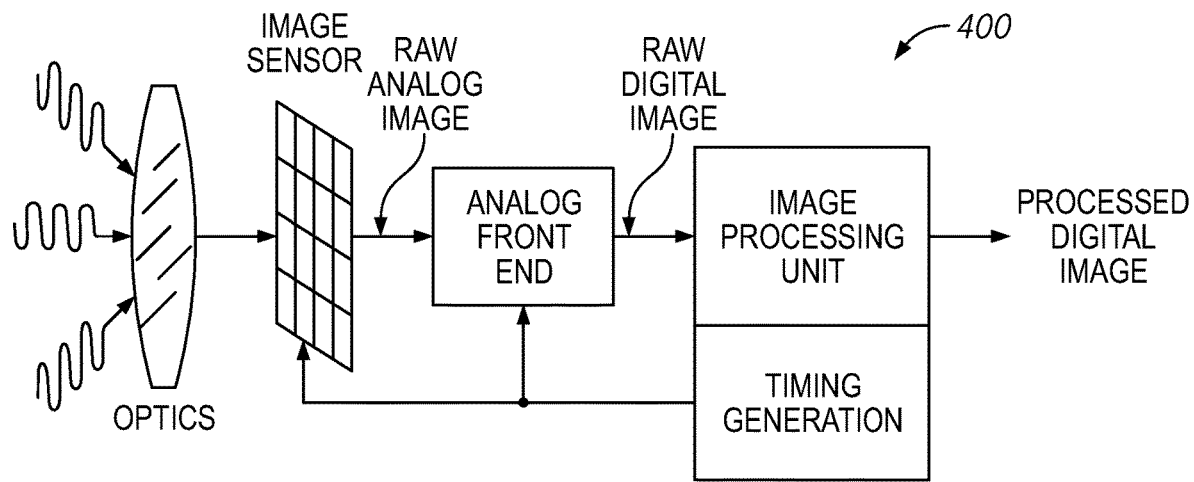
FIG. 4 is a block diagram of a scanner system in accordance with an embodiment of the subject technology.

Referring now to FIG. 4, a scanner system 400 is shown according to an exemplary embodiment. The scanner system 400 may be a high resolution type scanner apparatus. Generally, the scanner system 400 may be integrated into the MFP system 300 or may be a standalone unit connected to a network. In some embodiments, the methods described in FIG. 1 and FIG. 2 may be performed by the scanner system 400 which may process a paper document for invisible information using embedded software that is administered by the image processing unit.

Figure 5:
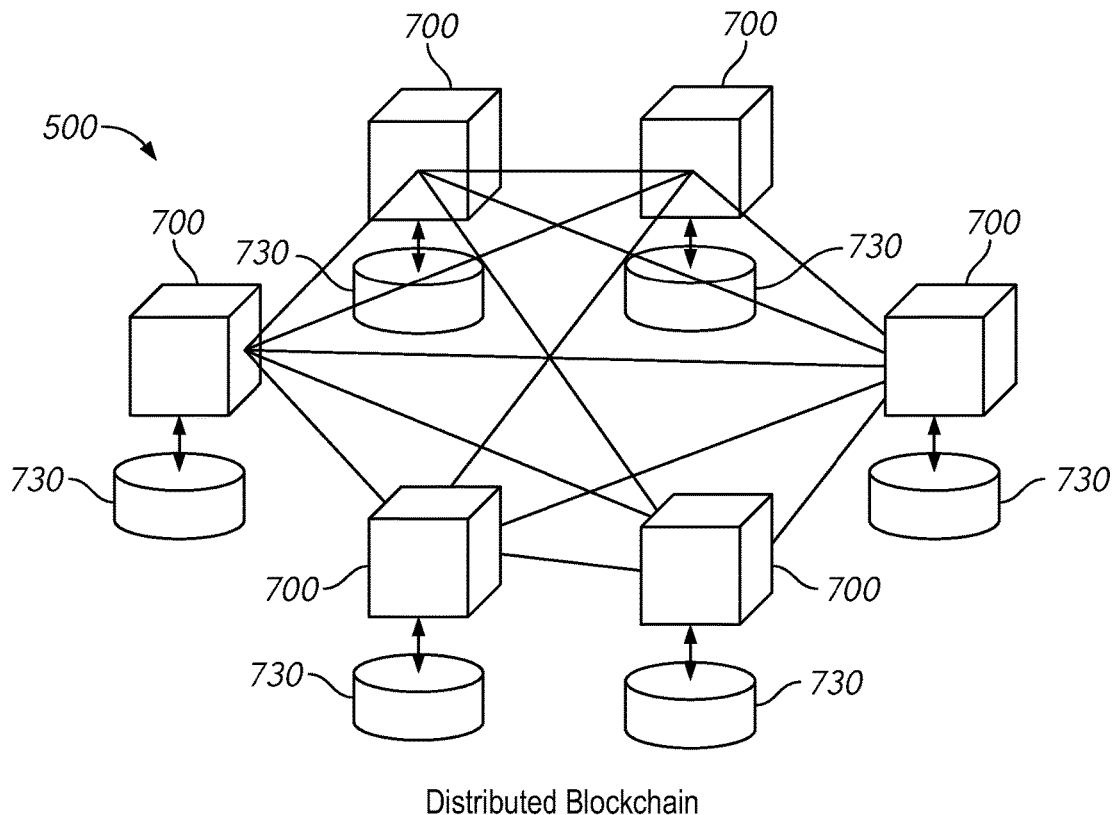
FIG. 5 is a block diagram of a distributed blockchain ledger in accordance with an embodiment of the subject technology.

FIG. 5 shows a distributed ledger 500 that may be used in conjunction with the method 100 disclosed above in FIG. 1. The distributed ledger 500 may generally comprise a plurality of computing devices 700, with each device including a database 730 storing data including copies of authenticated documents and metadata which may be referenced during authentication processes described with respect to blocks 182-194. The distributed ledger 500 may be part of the DMS or CRM system 150. The database may be consensually shared and synchronized across a network spread across multiple sites, institutions or geographies. The distributed ledger database (which includes the multiple database repositories 730 of each computing device 700) is spread across several nodes (computing devices 700) on a peer-to-peer network, where each replicates and saves an identical copy of the ledger and updates itself independently. The primary advantage is the lack of central authority. When a ledger update happens, each node constructs the new transaction, and then the nodes vote by consensus algorithm on which copy is correct. Once a consensus has been determined, all the other nodes update themselves with the new, correct copy of the ledger. Security is accomplished through cryptographic keys and signatures.

The distributed ledger 500 may be a blockchain network in some embodiments, which is a ledger that records a historic of transactions between all the users since its creation. It permits the storage and transmission of information. The database is distributed, which means the transactions are validated by a consensus process and shared to all the participants (Peer-to-peer). It allows counterparties to make secured direct transactions without a central intermediary. Trust is ensured through a mutual consensus verification protocol. The set of rules and procedures for authenticating and validating the information are added to the distributed ledger by the members of the network (all the members or a majority) and not by a central authority.

Figure 6:
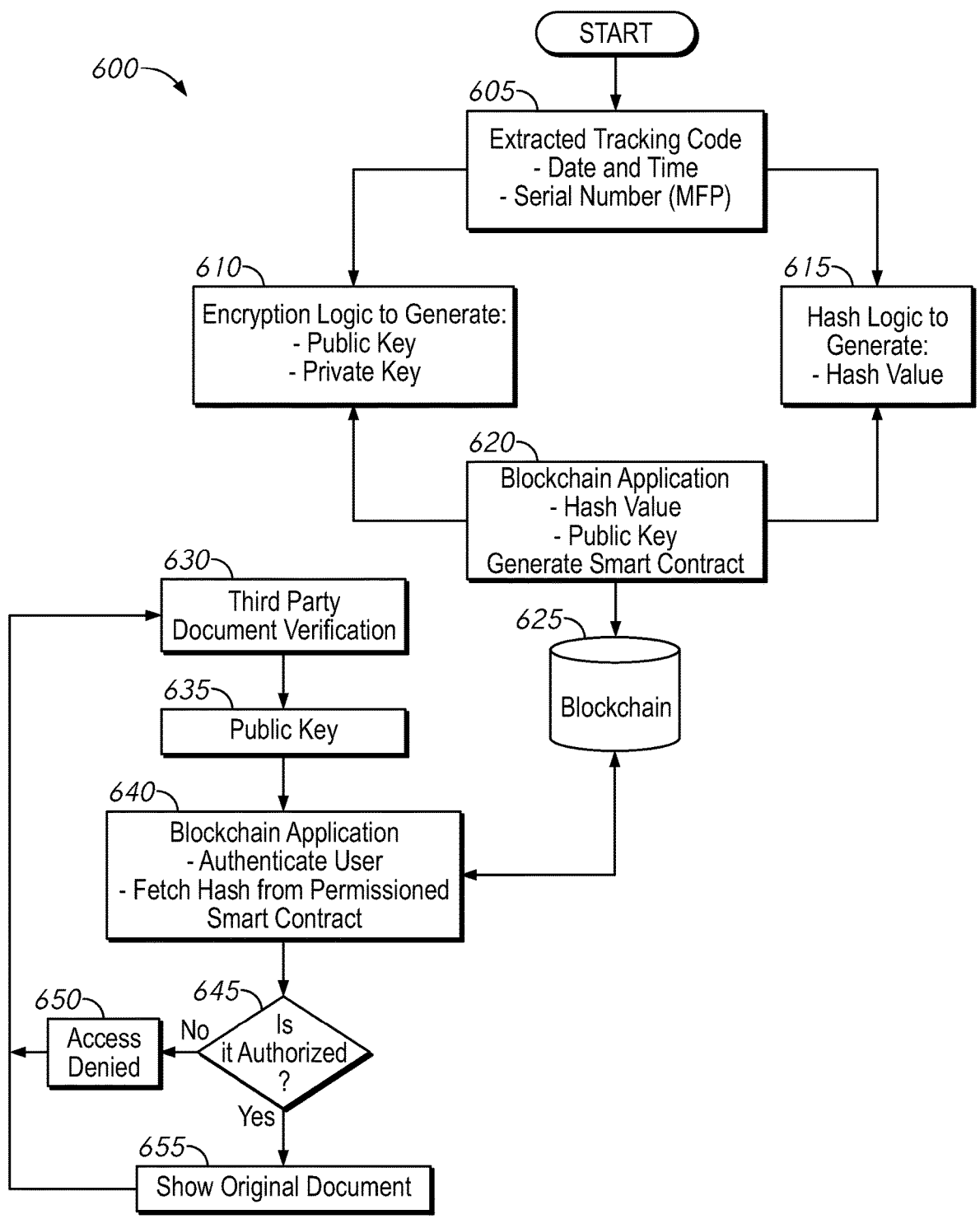
FIG. 6 is a flowchart of a method of authenticating access to a document in accordance with an embodiment of the subject technology.

Referring now to FIG. 6, a method 600 of authenticating access to a document is shown according to an exemplary embodiment. As will be understood, the method 600 may operate in conjunction with (or with aspects of) the embodiments disclosed above. In general, the method 600 may be considered a two-part process. The first part is for generating a smart contract with a hash value based on hidden information (for example, tracking codes) extracted from a document. The second part provides verification that a party requesting electronic access to a document has permission to access the document. Proof of access is based on the requesting party providing a system authorized key that is authenticated against information which may be stored in a blockchain network.

For example, in block 605, a document may be read for its hidden information. In some embodiments, the hidden information may be one of the extracted tracking codes that were embedded in an original document described above. The hidden information may be metadata. Metadata may include for example, a date and time of the document's creation (or some other timestamp associated with the document). Metadata may also include a serial number assigned to the document. In block 610, encryption logic may be applied to the information read from block 605 to generate a public/private key pair associated access to the document. In some embodiments, hash logic may concurrently generate a hash value for the public/private key pair in block 615. In block 620, the hash value and a public key may be used to generate a smart contract for access to the document. In some embodiments, the smart contract generation process may be operated within a blockchain application of a blockchain that provides authentication for access to documents. In block 625, the smart contract may be entered into a blockchain network.

In block 630, a party may request access to a document stored in a database. To access the document, a verification process based on the information from the tracking code of block 605 may be implemented. In block 635, the system may receive a public key generated message from the requesting party. In block 640, the public key/private key process may be retrieved from the blockchain and used to generate a hash value to authenticate the user's access to the document. In block 645, the system may determine whether the hash value generated by the requesting party matches the hash value to execute the smart contract generated for the document. If the hash value comparison is a match, then the original document may be accessed by the requesting party in block 655. Otherwise, in block 650, access may be denied if the hash values do not match.

Figure 7:
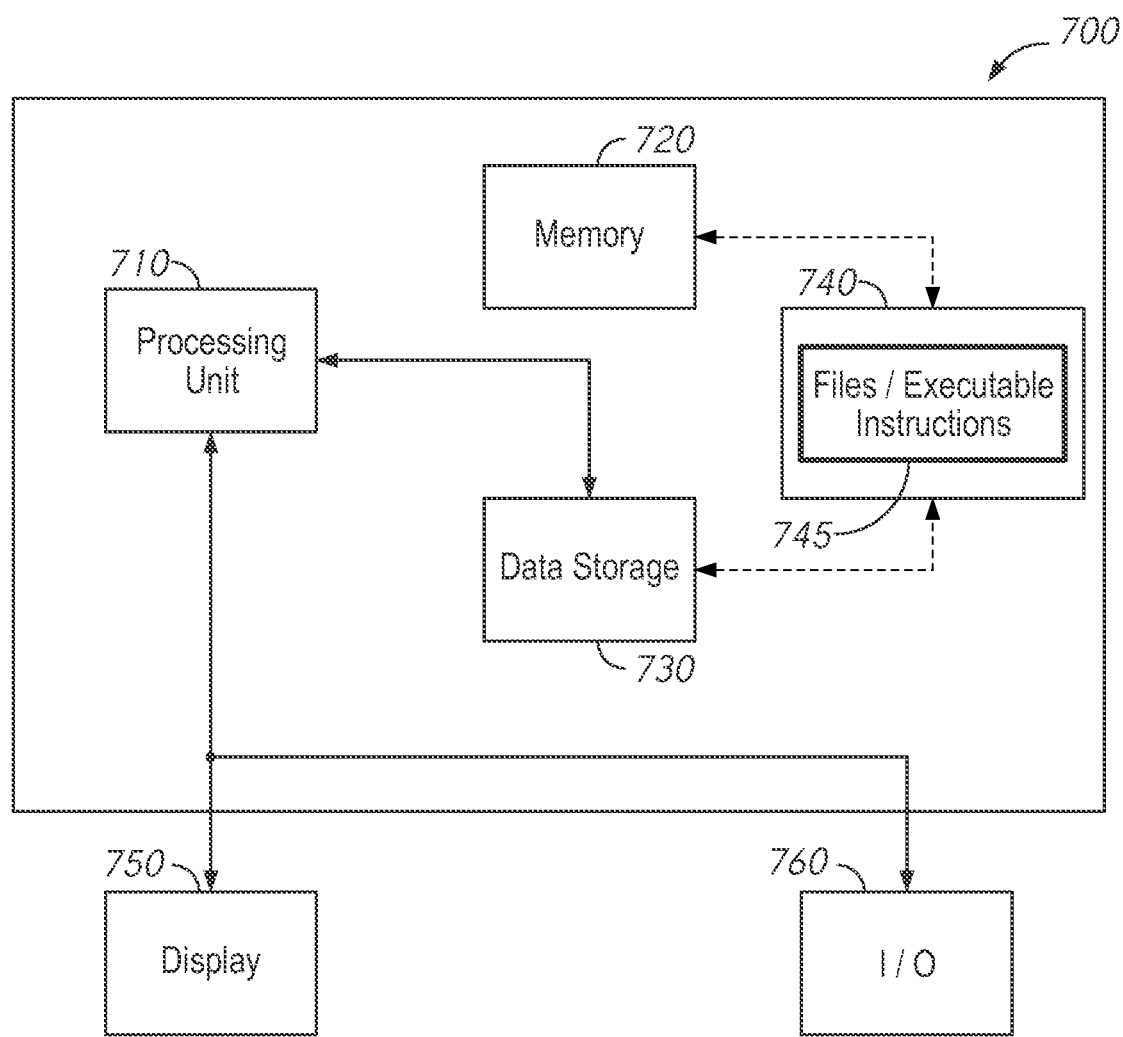
FIG. 7 is a block diagram of a computing device in accordance with an aspect of the subject technology.

Referring now to FIG. 7, a computing device 700 is shown according to an exemplary embodiment. The computing device 700 may be for example, a computer system or a computer server. In some embodiments, the MFP 110, the MFP 300, and the scanner system 400 may be other examples of a computing device 700. As will be appreciated, some aspects of the embodiments disclosed above may turn the computing device 700 into a special purpose computer system for identifying invisible information/tracking codes and extracting the codes from documents. For example, in the role of a host server, the computing device 700 may implement for example the functions related to posting blockchain requests for authentication of documents or for authenticating authorized access to a document as described above. In the role of a user device, the computing device 700 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics (generally connected to a printer or scanner) to perform the extraction of hidden information/tracking codes.

The components of the computing device 700, may include, but are not limited to, one or more processors or processing units 710, a system memory 720, data storage 730, a computer program product 740 having a set of program modules 745 including files and executable instructions, and a bus system that couples various system components including the system memory 720 to the processor(s) 710. The memory storage 720 may store for example, electronic files of the smart contract criteria and print advertisement content. In some embodiments, the processors 710 may include a processing unit dedicated to graphics and image processing (for example a graphics processing unit (GPU) or visual processing unit (VPU). As a GPU or VPU, the processor 710 may implement executable instructions focused on image processing applications either alone or in coordination with other general processor 710 types such a CPUs, microchips, and the like.

The computing device 700 may be described in the general context of computer system executable instructions, such as the program modules 745 which represent a software embodiment of the system and processes described generally above with respect to FIGS. 1 and 2. The program modules 745 generally carry out the functions and/or methodologies of embodiments as described above. The computing device 700 may typically include a variety of computer system readable media. Such media could be chosen from any available media that is accessible by the computing device 700, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 720 could include one or more computer system readable media in the form of volatile memory, such as a random-access memory (RAM) and/or a cache memory. By way of example only, the data storage system 730 may read from and write to a non-removable, non-volatile magnetic media device. An example of a data storage system is shown as a "hard drive" in the main processing block 320 of FIG. 3. The data storage system may also sometimes be referred to as a "database" 730 and may represent an entirely hardware-based storage, an entirely software-based storage, or both. The system memory 720 and/or data storage system 730 may include at least one program product 740 having a set (e.g., at least one) of program modules 745 that are configured to carry out the functions of embodiments of the invention in the form of computer executable instructions. The program product/utility 740, having a set (at least one) of program modules 745, may be stored as an operating system, one or more application programs, other program modules, and program data. Some embodiments may generate an electronic user interface (viewable and controllable from the display unit shown in the UI block 340 of FIG. 3) that may allow the user to enter smart contract information and post blockchain requests.

The computing device 700 may communicate with one or more external devices including for example, an electronic display 750 which may in some embodiments be configured for tactile response as in a touch screen display. User input into the display 750 may be registered at the processor 710 and processed accordingly. Other devices may enable the computing device 700 to communicate with one or more other computing devices, either by hardwire or wirelessly. Such communication can occur via Input/Output (I/O) interfaces/ports 760. In some embodiments, the I/O interfaces/ports 760 may be specially configured to handle aspects of the embodiments described herein converting the computing device 700 into a special purpose machine. For example, as a printer, the I/O interfaces/ports 760 may be configured to transmit messages related to extraction of information and conversion of documents into documents without embedded hidden information. The I/O interfaces/ports 760 may also include printing modules (for example, ink jet print heads, laser print systems, etc.) for rendering print jobs.

The computing device 700, through the I/O interface/ports 760, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 700 may be a cloud computing node connected to a cloud computing network which may be for example represented by the network shown in FIG. 5. The computing device 700 may be practiced in distributed cloud computing environments where tasks are performed by remote processing devices that are linked through a communications network. In a distributed cloud computing environment, program modules may be located in both local and remote computer system storage media including memory storage devices. In an exemplary embodiment, the blockchain 500 described above may be one form of a distributed cloud computing environment.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 750 which may be controlled via direct contact with the display 750 or via the I/O interfaces 760 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 710 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of protecting the authenticity of documents, comprising:

receiving a document, including invisible printed information, by an optical scanning device;

scanning the document;

capturing an image of content in the scanned document;

determining whether the invisible printed information was present in the captured image of content in the scanned document;

in response to a determination that the invisible printed information was not present, converting to a black and white mode of scanning;

identifying the invisible printed information in the captured image of the scanned document in the black and white mode of scanning;

extracting the invisible printed information from the captured image of the scanned document;

generating metadata representing the identified invisible printed information;

converting the captured image of the scanned document into an electronic copy of the received document, without the invisible printed information being present in the electronic copy; and attaching the generated metadata to the converted electronic copy of the received document.

2. The method of claim 1, wherein the generated metadata is embedded into the converted electronic copy of the received document.

3. The method of claim 1, wherein the generated metadata is text visible in the converted electronic copy of the received document.

4. The method of claim 1, wherein the generated metadata is at least one of encrypted text and encrypted symbols.

5. The method of claim 4, wherein the electronic copy of the received document includes a copy of the generated metadata including the at least one of encrypted text and encrypted symbols; and the method further comprises:

providing the electronic copy of the received document including the at least one of encrypted text and encrypted symbols as an authenticated copy of the received document, provided through an encrypted transaction.

6. The method of claim 1, wherein the invisible printed information is tracking code information.

7. The method of claim 6, wherein the tracking code information includes a timestamp and serial code associated with the received document.

8. A computer program product to protect the authenticity of documents, the computer program product comprising a non-transitory computer readable storage medium having computer readable program code embodied therewith, the computer readable program code being configured, when executed by a processing unit, to:

receive a document, including invisible printed information, by an optical scanning device;

scan the document;

capture an image of content in the scanned document;

determine whether the invisible printed information was present in the captured image of content in the scanned document;

in response to a determination that the invisible printed information was not present, convert to a black and white mode of scanning;

identify the invisible printed information in the captured image of the scanned document in the black and white mode of scanning;

generate metadata representing the identified invisible printed information;

extract the invisible printed information from the captured image of the scanned document;

convert the captured image of the scanned document into an electronic copy of the received document, without the invisible printed information being present in the electronic copy; and attach the generated metadata to the converted electronic copy of the received document.

9. The computer program product of claim 8, wherein the generated metadata is embedded into the converted electronic copy of the received document.

10. The computer program product of claim 8, wherein the generated metadata is text visible in the converted electronic copy of the received document.

11. The computer program product of claim 8, wherein the generated metadata is at least one of encrypted text and encrypted symbols.

12. The computer program product of claim 11, wherein the electronic copy of the received document includes a copy of the generated metadata including the at least one of encrypted text and encrypted symbols; and the computer programmable code is further configured to, provide the electronic copy of the received document including the at least one of encrypted text and encrypted symbols as an authenticated copy of the received document, provided through an encrypted transaction.

13. The computer program product of claim 8, wherein the invisible printed information is tracking code information.

14. The computer program product of claim 13, wherein the tracking code information includes a timestamp and serial code associated with the received document.

15. A computing apparatus, comprising:

an optical scanner module;

a memory storage unit; and a processing unit coupled to the optical scanner module and to the memory storage unit, wherein computer readable program code in the memory storage unit is configured to protect the authenticity of documents, by controlling the processing unit to:

receive a document, including invisible printed information, by the optical scanner module;

scan the document;

capture an image of content in the scanned document;

determine whether the invisible printed information was present in the captured image of content in the scanned document;

in response to a determination that the invisible printed information was not present, convert to a black and white mode of scanning;

identify the invisible printed information in the captured image of the scanned document in the black and white mode of scanning;

generate metadata representing the identified invisible printed information;

extract the invisible printed information from the captured image of the scanned document;

convert the captured image of the scanned document into an electronic copy of the received document, without the invisible printed information being present in the electronic copy; and attach the generated metadata to the converted electronic copy of the received document.

16. The computing apparatus of claim 15, wherein the generated metadata is embedded into the converted electronic copy of the received document.

17. The computing apparatus of claim 15, wherein the generated metadata is text visible in the converted electronic copy of the received document.

18. The computing apparatus of claim 15, wherein the generated metadata is at least one of encrypted text and encrypted symbols.

19. The computing apparatus of claim 18, wherein the electronic copy of the received document includes a copy of the generated metadata including the at least one of encrypted text and encrypted symbols; and the processing unit is further configured to, provide the electronic copy of the received document including the at least one of encrypted text and encrypted symbols as an authenticated copy of the received document, provided through an encrypted transaction.

20. The computing apparatus of claim 15, wherein the invisible printed information is tracking code information including a timestamp and serial code associated with the received document.

\* \* \* \* \*